Nov. 9, 1971  A. C. WICKMAN  3,618,425
CHANGE-SPEED GEARING
Filed July 23, 1969
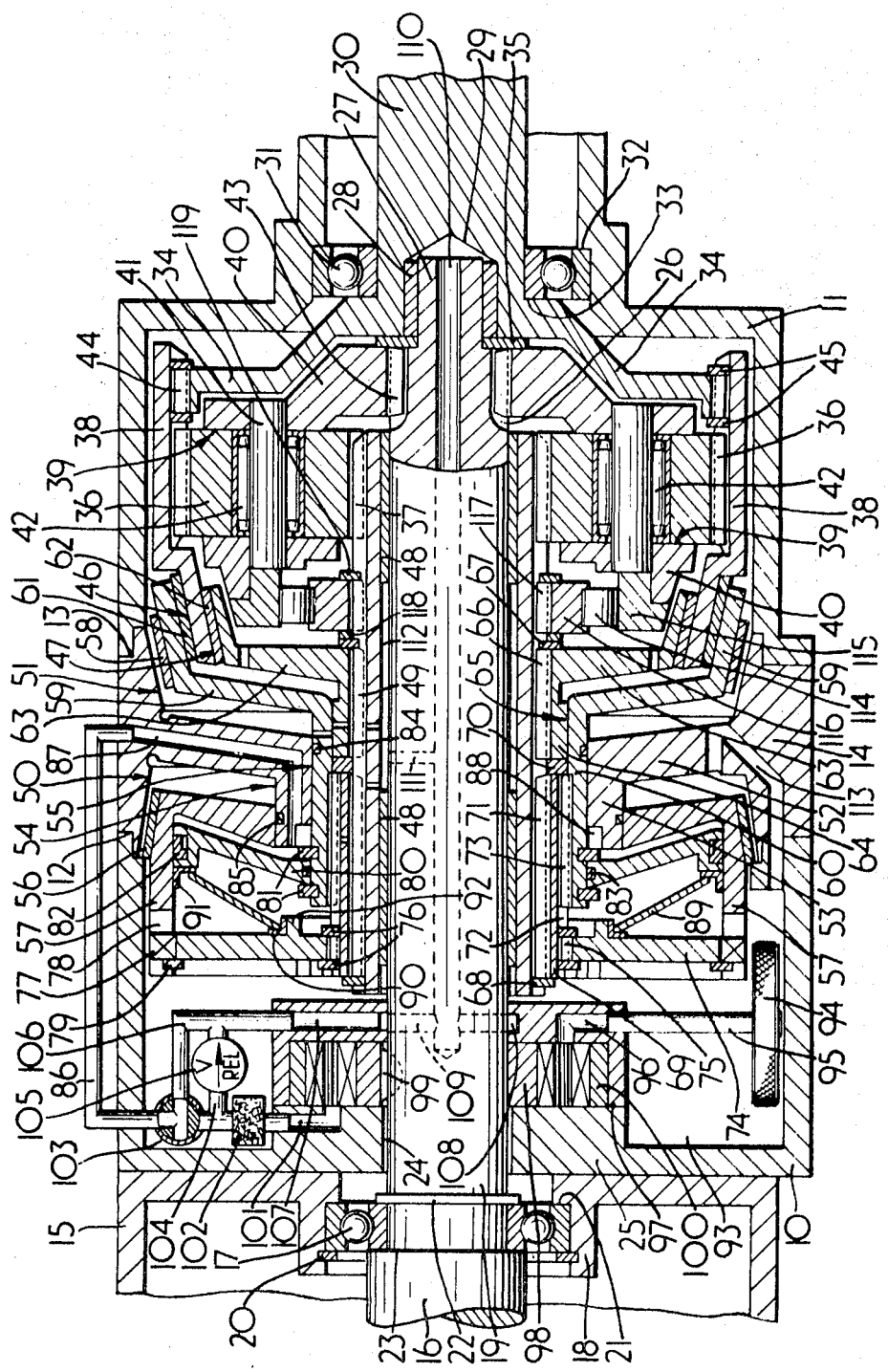
INVENTOR
AXEL CHARLES WICKMAN
BY Holman, Glascock,
Downing & Seebold
ATTORNEYS

United States Patent Office 3,618,425
Patented Nov. 9, 1971

3,618,425
CHANGE-SPEED GEARING
Axel Charles Wickman, 69 S. Washington Drive,
St. Armands Key, Sarasota, Fla. 33577
Filed July 23, 1969, Ser. No. 843,972
Claims priority, application Great Britain, July 26, 1968,
35,754/68
Int. Cl. F16d 67/04; F16h 5/18
U.S. Cl. 74—781    5 Claims

ABSTRACT OF THE DISCLOSURE

A change-speed gearing suitable or automobiles or boats has a planetary gear train including a power input member, a power output member, and a reaction member. Two ratio selectors are provided for selecting planetary ratio by holding the reaction member against rotation and for selecting unit ratio by locking the reaction member to a rotary component of the gear train. The ratio selectors each include a pair of friction-engaging members with complementary friction-engaging surfaces. In at least one of the pairs of members the members are movable axially in opposite directions into operative and inoperative positions in which they engage and disengage with their respective friction-engaging surfaces. Axial bias means are provided for moving the pairs of members into the operative and inoperative positions.

---

The invention concerns a change-speed gearing of the type having a planetary gear train including a power input member, a power output member, a reaction member, a first ratio selecting means operable for holding the reaction member against rotation whereby the planetary gear train will transmit drive between the power input member and the power output member at a planetary ratio, and a second ratio selecting means operable for locking the reaction member to another rotary component of the planetary gear train whereby the planetary gear train will transmit drive between the power input member and the power output member at unit ratio.

Change-speed gearings of this type are frequently uses in the automotive field and are particularly used in the form of auxiliary two-speed gearings which provide a unit drive ratio and a planetary overdrive or underdrive ratio. Such an auxiliary two-speed gearing may be arranged in a variety of positions in the transmission system of a motor road vehicle or a speedboat and it serves to modify the existing torque/speed characteristic of a transmission system either to provide increased torque at a given speed in the case of an underdrive, or to provide a given speed at reduced torque in the case of an overdrive. The differential advantages of both types of auxiliary two-speed gearing are already well-known in the art and no further comment on this aspect is necessary.

However, both types of auxiliary two-speed gearing are typically controlled by a frusto-conical clutch element and a frusto-conical brake element which are both rotatively fast with the reaction member, for instance the sun gear wheel, and are alternatively operable to engage respective clutch and brake surfaces. The clutch surface is defined by another rotary component of the epicyclic gearing, for instance the annulus gear wheel, and the brake surface is defined by a non-rotary casing. The clutch and brake elements are usually arranged for operation in opposite directions and are operated by actuating a fluid-operable piston and cylinder device in opposition to a preloaded spring device. The latter reacts between the non-rotary casing and the brake and clutch elements to urge one into engagement with its corresponding surface whilst the other is disengaged—usually the preloaded spring device is arranged to cause the engagement of the lower transmission ratio. Actuation of the fluid-operable piston and cylinder device overcomes the preloaded spring device to reverse the respective engagement and disengagement of the brake and clutch elements.

With this known arrangement the torque capacity of the change-speed gearing, apart from the maximum torque capacity of the planetary gear train, depends on the area of the brake and clutch elements and the forces with which they are engaged. Bearing in mind that there is a practicable limit to the load per unit area that can be applied to a friction material such as those used for brake and clutch linings, any increase in torque capacity of a given change-speed gearing essentially incurs an increase of both the area of brake and clutch linings and an increase in the engagement forces. Inevitably, with the known arrangement, an increase in the area of brake and clutch linings involves an increase in the overall diameter of the change-speed gearing unit and incurs the cost penalty of a larger and heavier casing. Furthermore, with the known arrangement, the casing of the change-speed gearing unit must be sufficiently strong to be unaffected by the reactions of the preloaded spring device and of the fluid-operable piston and cylinder device. In this connection it should be appreciated that both the preloaded spring device and the fluid-operable piston and cylinder device exert equal and opposite reactions on the casings as the respective engagement forces applied to the brake and clutch elements are inevitably earthed to the casing. As both the brake and clutch elements are essentially capable of rotation, several thrust bearings are usually required for transmitting the axial forces generated by the preloaded spring device and the fluid-operable piston and cylinder device between the non-rotary casing and the revolving components.

An object of the present invention is to enable the torque capacity of a change-speed gearing to be increased without necessarily increasing the diameter of the non-rotary casing. Another object of the invention is to enable the forces applied to the non-rotary casing by the preloaded spring device and the fluid-operable piston and cylinder device to be reduced.

According to the invention a change-speed gearing has a planetary gear train including a power input member, a power output member, and a reaction member, a first ratio selecting means operable for holding the reaction member against rotation whereby the planetary gear train will transmit drive between the power input member and the power output member at a planetary ratio, a second ratio selecting means operable for locking the reaction member to another rotary component of the planetary gear train whereby the planetary gear train will transmit drive between the power input member and the power output member at unit ratio, one of said ratio selecting means includes a pair of friction-engaging members which are rotatively fast with the reaction member but are axially movable relatively to each other, one of said friction-engaging members being axially movable in one direction from an operative position in which it is engaged with a complementary first friction-engaging surface to an inoperative position in which it is disengaged from said first friction-engaging surface, the other of said friction-engaging members being axially movable in the opposite direction from an operative position in which it is engaged with a complementary second friction-engaging surface to an inoperative position in which it is disengaged from said second friction-engaging surface, a first axial bias means arranged for reacting between the pair of friction-engaging members for biasing them to their said respective operative positions, a second axial bias means arranged for reacting between the pair of friction-engaging members for biasing them to their said respective inoperative positions, and a control means for regulating the operation of the first and second axial bias means to determine whether the friction-engaging members will be biased to their said respective operative or inoperative positions.

Preferably one of said first and second axial bias means is a preloaded spring device reacting between the pair of friction-engaging members, the other of said first and second axial bias means is a fluid-operable piston and cylinder device arranged for reacting between the pair of friction-engaging members in opposition to the preloaded spring device, and said control means is arranged to regulate the operation of the fluid-operable piston and cylinder device between a first condition in which the preloaded spring device will exert a dominant bias on the pair of friction-engaging members and a second condition in which the fluid-operable piston and cylinder device will overcome the bias of the preloaded spring device and will exert an opposite dominant bias on the pair of friction-engaging members. The fluid-operable piston and cylinder device may be arranged to exert differential forces on the pair of friction-engaging members whereby the friction-engaging members whereby the friction-engaging member on which the greater force is exerted will be moved axially against the bias of the preloaded spring device before the friction-engaging member on which the lesser force is exerted will start to move axially against the bias of the preloaded spring device.

Preferably the other of said ratio selecting means includes a second pair of friction-engaging members which are also rotatively fast with the reaction member and are axially movable relatively to each other, one friction-engaging member of the second pair is axially movable in said one direction from an operative position in which it is engaged with a complementary third friction-engaging surface to an inoperative position in which it is disengaged from said third friction-engaging surface, the other friction-engaging member of the second pair is axially movable in the said opposite direction from an operative position in which it is engaged with a complementary fourth friction-engaging surface to an inoperative position in which it is disengaged from said fourth friction-engaging surface, said first axial bias means is arranged for reacting between the second pair of friction-engaging members for biasing them to their said respective inoperative positions, and said second axial bias means is arranged for reacting between the second pair of friction-engaging members for biasing them to their said respective operative positions, whereby the operation of said first axial bias means by said control means will cause the first pair of friction-engaging members to be biased to their respective operative positions whilst causing the second pair of friction-engaging members to be biased to their respective inoperative positions, and the operation of said second axial bias means by said control means will cause the first pair of friction-engaging members to be biased to their respective inoperative positions whilst causing the second pair of friction-engaging members to be biased to their respective operative positions.

The first and second complementary friction-engaging surfaces are preferably respective first and second brake surfaces defined by non-rotary structure, the third and fourth complementary friction-engaging surfaces are respective first and second clutch surfaces defined by structure rotatively fast with said another rotary component of the planetary gear train, said one ratio selecting means being the first ratio selecting means whereby the first pair of friction-engaging members are in the form of brake members, said other ratio selecting means being the second ratio selecting means whereby the second pair of friction-engaging members are in the form of clutch members, the brake member for engaging the first brake surface is held axially fast with the clutch member for engaging the second clutch surface, and the brake member for engaging the second brake surface is held axially fast with the clutch member for engaging the first clutch surface. The first axial bias means may be a fluid-operable piston and cylinder device reacting between the brake members for engaging the first and second brake surfaces, and the second axial bias means is a preloaded spring device reacting between the clutch members for engaging the first and second clutch surfaces.

The brake member for engaging the second brake surface and the clutch member for engaging the first clutch surface may be axially fast with an axially-movable sleeve which is secured to the piston of said fluid-operable piston and cylinder device, the brake member for engaging the first brake surface defines the cylinder of said fluid-operable piston and cylinder device, first combined sliding and rotary sealing means are arranged between the piston and the brake member for engaging the first brake surface, and second combined sliding and rotary sealing means are arranged operatively between the axially movable sleeve and the brake member for engaging the first brake surface. Preferably a tubular sleeve fast with the non-rotary structure defining the first and second brake surfaces extends into the fluid-operable piston and cylinder device between the axially movable sleeve and the brake member for engaging the first brake surface, one portion of said second combined sliding and rotary sealing means is arranged between the axially movable sleeve and the tubular sleeve, another portion of said second combined sliding and rotary sealing means is arranged between the tubular sleeve and the brake member for engaging the first brake surface, and the tubular sleeve defines a passage for the supply of operating fluid to the interior of the piston and cylinder device. Preferably the brake member for engaging the first brake surface is secured to a second axially movable sleeve which extends coaxially through the first said axially movable sleeve, the first and second axially movable sleeves are drivingly secured to each other but are arranged for relative axial movement, the second axially movable sleeve is fast with the clutch member for engaging the second clutch surface at the opposite axial end to its connection with the brake member for engaging the first brake surface, and the preloaded spring device is arranged to react between the piston of said fluid-operable piston and cylinder device and the second axially movable sleeve.

In the case where the planetary ratio is arranged to be a planetary overdrive ratio, the said second ratio selecting means may include a unidirectional clutch for locking the planetary gear train whenever the first ratio selecting means is inoperative and the power input member is driving the power output member in a forward sense. Alternatively in the case where the planetary ratio is arranged to be a planetary underdrive ratio, the said first ratio selecting means may include a unidirectional clutch for locking the reaction member against rotation whenever the second ratio selecting means is inoperative and the power input member is driving the power output member in a forward sense.

If desired, the transmission of torque between the planetary gear train and at least one of the said ratio selecting means through said reaction member may be arranged to pass through helically-engaged surfaces to produce an axial end thrust commensurate with the torque applied to said helically-engaged surfaces, and abutment means arranged to apply the axial end thrust to increase the force of engagement of the corresponding friction engaging members under predetermined drive conditions.

The invention is now described, by way of example only, with reference to the accompanying drawing which is a diagrammatic longitudinal section through an auxiliary two-speed gear unit providing optionally an overdrive planetary ratio and a unit or direct drive ratio.

With reference to the drawing, the auxiliary gearing is arranged within a composite gear casing defined by front and rear casings 10 and 11 which are secured by respective alignment spigots 1 and 13 and unshown bolts to a centre casing 14. The auxiliary gearing illustrated is intended for use in the transmission system of a conventional front engine rear-wheel-drive car, in a position intermediate a main change-speed gearing and a propeller shaft for driving a final drive gearing for the rear wheels. In the drawing, a casing 15 houses the unshown main change-speed gears and is secured to the front casing 10 of the auxiliary gearing by unshown bolts. The main change-speed gearing has a power output shaft 16 which is supported by a combined thrust and journal bearing 17 from a boss 18 formed integral with the main change-speed gear casing 15, and is formed with a special integral extension shaft 19 for driving the auxiliary change-speed gearing. The outer race of the bearing 17 is axially trapped by a circlip 20 against a shoulder 21 of the boss 18, and the inner race of the bearing 17 is axially trapped by a circlip 22 against a shoulder 23 formed at the junction between the shaft 16 and the extension shaft 19—in this manner the shafts 16 and 19 are supported for both axial and journal loads from the main change-speed gear casing 15.

The extension shaft 19 extends with working clearance through a bore 24 in a web 25 formed integral with the front casing 10, and has its right-hand end formed with external splines 26 and a reduced diameter coaxial spigot 27 which is rotatively supported by a bearing bush 28 in a coaxial bore 29 formed in a power output shaft 30 from the auxiliary gearing. The power output shaft 30 is supported by a combined journal and thrust bearing 31 from the rear casing 11 for rotation about the same axis as shafts 16 and 19, and the broken-off portion of the power output shaft 30 is connected in a conventional manner to an unshown driving flange for the propeller shaft and is additionally supported from the broken-off portion of the rear casing 11 by an unshown journal bearing and an associated oil seal. The outer race of the bearing 31 bears against a shoulder 32 of the rear casing 11, and the inner race of the bearing 31 bears against an opposed shoulder 33 formed at the junction of the power output shaft 30 with an integral driving flange 34. In this manner the bearing 31 will transmit to the rear casing 11 any axial loads exerted to the right on the power output shaft 30, together with all journal loads, and any axial loads exerted to the left on the power output shaft 30 are transmitted to the main change-speed gear casing 15 through a thrust washer 35, the extension shaft 19 and the bearing 17. Journal loads exerted by the right-hand end of the extension shaft 19 are transmitted to the rear casing 11 through the bush 28, the power output shaft 30 and the bearing 31.

The auxiliary gear-train is a simple planetary gearing comprising four straight-toothed planet gear wheels 36, of which only two can be seen, meshing with a straight-toothed sun gear wheel 37 and a straight-toothed annulus gear wheel 38. The planet gear wheels 36 are located in equi-spaced radial apertures 39 in a planet carrier 40 and are mounted for rotation on respective parallel pins 41 through respective intermediate needle roller bearing capsules 42. The planet carrier 40 is formed with integral internal splines 43 meshing with the splines 26 to be driven by the extension shaft 19, and constitutes the power input member of the planetary gear train 36, 37 and 38. The annulus gear wheel 38 has the right-hand portions of its gear teeth intercalated with external splines 44 formed integral with the driving flange 34, the annulus gear wheel 38 being axially located relative to the driving flange 34 by means of a pair of circlips 45 which engage annular slots formed in the gear teeth of the annulus gear wheel and abut the axial end faces of the splines 44. In this manner the annulus gear wheel 38 is held axially and rotatively fast with the driving flange 34 and the integral power output shaft 30, and the annulus gear wheel 38 constitutes the power output member of the planetary gear train. On the axial side remote from the driving flange 34, the annulus gear wheel 38 is formed integral with a frusto-conical extension which is coaxial with the shafts 16, 19 and 30 and defines first and second frusto-conical clutch surfaces 46 and 47 respectively. The reaction member of the planetary gear train is the sun gear wheel 37 which is supported by a pair of bearing bushes 48 for rotation and axial sliding coaxially about the extension shaft 19. The sun gear wheel 37 is provided with continuous gear teeth 49 throughout its length which extends from a position close to the web 25 of the front casing 10 to a position close to the planet carrier 40.

The centre casing 14 defines first and second frusto-conical brake surfaces 50 and 51 separated by a generally radial web 52 supporting an integral tubular sleeve 53 which defines respective outer and inner cylindrical surfaces 54 and 55 coaxial with the sun gear wheel 37.

A first friction-engaging brake member 56 in the form of a frusto-conical friction lining is secured by bonding to a cylinder 57 which is axially slidable to the right along the outer cylindrical surface 54 for engaging the first brake member 56 with the first brake surface 50, and is subsequently slidable to the left to effect disengagement. A second friction-engaging brake member 58, also in the form of a frusto-conical friction lining, is secured by bonding to the outer surface of a first disc 59 formed integral with a first sleeve 60 which is axially slidable to the left within the inner cylindrical surface 55 for engaging the second brake member 58 with the second brake surface 51, and is subsequently slidable to the right to effect disengagement.

A first friction-engaging clutch member 61, in the form of a frusto-conical friction lining, is secured by bonding to the inner surface of the first disc 59 such that axial sliding of the first disc 59 to the left will disengage the first clutch member 61 from the first clutch surface 46, and subsequent sliding to the right will effect re-engagement. A second friction-engaging clutch member 62, also in the form of a frusto-conical friction lining, is secured by bonding to a second disc 63 formed integral with a second sleeve 64 which is axially slidable to the right within an inner cylindrical surface 65 defined by the first sleeve 60 for disengaging the second clutch member 62 from the second clutch surface 47, and is subsequently slidable to the left to effect re-engagement.

Only the extreme right-hand portion of the sun gear teeth 49 serve as gear teeth, the remainder of the sun gear teeth 49 serving as external splines. In order to distinguish between these two separate functions, reference will only be made to the sun gear teeth 49 when they are serving the function of gear teeth, and otherwise reference will be made to the sun gear splines 49. The second sleeve 64 is formed with internal splines 66 meshing with the sun gear splines 49, and is locked axially to the sun gear wheel 37 by means of a pair of opposed circlips 67 and 68 between which are also sandwiched a third sleeve 69 and a plain spacer 70. The third sleeve 69 is formed with internal splines 71 which mesh with the sun gear splines 49, and is also formed with external splines 72 which mesh with internal splines 73 defined by the first sleeve 60 adjacent its inner cylindrical surface 65. A third disc 74 is formed with internal splines 75 meshing with the splines 72 of the third sleeve 69, and is axially located by means of a pair of opposed circlips 76 engaging annular slots formed in the splines 72. The radially outer extremity of the third disc 74 is formed integral with an equi-spaced series of radial fingers 77 which are an axial sliding fit in corresponding axial slots 78 formed in the left-hand periphery of the cylinder 57, the radial fingers 77 being retained by a single circlip 79.

The left-hand end of the first sleeve 60 is held axially fast with a piston 80 by a pair of opposed circlips 81 which engage annular slots formed in the first sleeve 60 and abut the axial end faces of the piston 80. The radially outer extremity of the piston 80 is formed with an annular groove carrying a piston ring 82 which seals the piston 80 against the inside of its cylinder 57. Another seal 83 is arranged to inhibit leakage between the piston 80 and the first sleeve 60, a further seal 84 is arranged to inhibit leakage between the sleeve 60 and the web 52, and another seal 85 is arranged to inhibit leakage between the cylinder 57 and the web 52. The cylinder 57 and the piston 80 constitute a first axial bias means 57, 80 in the form of a fluid-operable piston and cylinder device supplied with operating fluid through a combined supply and return duct 86 connected to a passage 87 drilled through the web 52 and the tubular sleeve 53. It will not be appreciated that the manner in which the tubular sleeve 53 is supported by the web 52, together with the positioning of the seals 84 and 85 and the positioning of the passage 87, is designed to enable the operating fluid to be fed from a stationary casing 14 in the piston and cylinder device 57, 80 which may be rotating at the same speed as the annulus gear wheel 38, or may be stationary as will be described later. It should also be noted that the tubular sleeve 53 is formed with a clearance portion 88 for the right-hand circlip 81, and that the seals 84 and 85 should be selected so that they are capable of reasonably efficient sealing during axial or rotational movement, and during combined axial and rotational movement. As the first sleeve 60 is held rotationally fast with the cylinder 57 through the splines 73, 72, the splines 72, 75, the third disc 74, the radial fingers 77 and the axial slots 78, it will be appreciated that the piston ring 82 only has to deal with pure axial movement and that the seal 83 only has static duties to perform.

A Belleville type spring washer 89 is arranged, as shown, in a preloaded condition reacting between reaction rings 90 and 91 respectively abutting the third disc 74 and the piston 80, the reaction ring 90 being located by an annular shoulder 92 integral with the third disc 74, and the reaction ring 91 being located by the bore of the cylinder 57. The spring washer 89 constitutes a second axial bias means 89 in the form of a preloaded spring device acting in opposition to the piston and cylinder device 57, 80.

It should be noted that the first and second brake members 56 and 58, and the first and second clutch members 61 and 62 are all held rotatively fast with the sun gear wheel 37. The first brake member 56 is held rotatively fast with the sun gear wheel 37 through the cylinder 57, the engagement of the axial slots 58 with the radial fingers 77, the third disc 74, the engagement of the splines 75 with the splines 72, the third sleeve 69, and the engagement of the splines 71 with the sun gear splines 49. The second brake member 58 and the first clutch member 61 are jointly held rotatively fast with the sun gear wheel 37 through the first disc 59, the integral first sleeve 60, the engagement of the splines 73 with the splines 72, the third sleeve 69, and the engagement of the splines 71 with the sun gear splines 49. The second clutch member 62 is held rotatively fast with the sun gear wheel 37 through the second disc 63, the integral second sleeve 64, and the engagement of the splines 66 with the sun gear splines 49.

Furthermore, it should be noted that the second brake member 58 and the first clutch member 61 are held axially fast with the piston 80 through the first sleeve 60 and the opposed circlips 81, and are axially slidable between the right-hand position shown in which the first clutch member 61 engages the first clutch surface 46, and a left-hand position in which the second brake member 58 engages the second brake surface 51 dependent on the operation of the piston and cylinder device 57, 80. The second clutch member 62 and the third disc 74 are held axially fast with the sun gear wheel 37 through the circlips 67, 68 and 76, and the whole assembly is axially slidable along the extension shaft 19 between the left-hand position shown in which the second clutch member 62 engages the second clutch surface 47, and a right-hand position in which the second clutch member 62 is disengaged again dependent on the operation of the piston and cylinder device 57, 80. Although the first brake member 56 is movable to the left from the position shown by compressing the preloaded spring 89, this condition will never exist with the auxiliary gearing illustrated as the load of the spring 89 holds the circlip 79 always in engagement with the third disc 74. The first brake member 56 accordingly behaves as if it were integral with the third disc 74 which serves to hold the first brake member 56 disengaged from the first brake surface 50 whenever the second clutch member 62 is engaging the second clutch surface 47 as shown, and serves to engage the first brake member 56 with the first brake surface 50 whenever the second clutch member 62 is disengaged.

The ratio selecting means for the auxiliary change speed gearing accordingly comprises a first axially slidable assembly including the piston 80, the first sleeve 60, the first disc 59, the second brake member 58 and the first clutch member 61; and a second axially slidable assembly including the cylinder 57, the third disc 74, the third sleeve 69, the sun gear wheel 37, the second disc 63, the first brake member 56 and the second clutch member 62. The preloaded spring 89 reacts between the first axially slidable assembly 80, 60, 59, 58, 61 and the second axially slidable assembly 57, 74, 69, 37, 63, 56, 62 to urge them in opposite directions for the first and second brake members 56 and 58 to be disengaged, and the first and second clutch members 61 and 62 to engage the first and second clutch surfaces 46 and 47, thereby locking the sun gear wheel 37 to the annulus gear wheel 38 to inhibit planetary motion whereby the extension shaft 19 is locked to the power output shaft 30 and the auxiliary gearing transmits drive at unit ratio. On the other hand, application of operating fluid through the combined supply and return duct 86 and the passage 87 causes the piston and cylinder device 57, 80 to oppose the action of the preloaded spring 89 to move the first axially slidable assembly 80, 60, 50, 58, 61 and the second axially slidable assembly 57, 74, 69, 37, 63, 56, 62 in the reverse directions for the first and second clutch members 61 and 62 to be disengaged, and the first and second brake members 56 and 58 to engage the first and second brake surfaces 50 and 51, thereby locking the sun gear wheel 37 to the centre casing 14 whereby the planetary gearing 36, 37, 38 will transmit drive between the extension shaft 19 and the power output shaft 30 at the planetary overdrive ratio.

Thus the engagement of the planetary overdrive ratio is effected by a first ratio selecting means comprising the first and second brake members 56 and 58, which are rotatively fast with the reaction sun gear wheel 37 but are axially movable relatively to each other in opposite directions to engage the first and second brake surfaces 50 and 51. The movement of the first and second brake members 56 and 58 to engage the first and second brake surfaces 50 and 51 being effected by the actuation of the piston and cylinder device 57, 80 in opposition to the preloaded spring 89. The engagement of the unit drive ratio is effected by a second ratio selecting means comprising the first and second clutch members 61 and 62, which are rotatively fast with the reaction sun gear wheel 37 but are axially movable relatively to each other in opposite directions to engage the first and second clutch surfaces 46 and 47. The movement of the first and second clutch members 61 and 62 to engage the first and second clutch surfaces 46 and 47 being effected by the preloaded spring 89 when the piston and cylinder device 57, 80 is exhausted.

It will accordingly be appreciated that the engagement of the planetary overdrive or unit ratios depends solely on the respective application or exhaust of operating fluid through the combined supply and return duct 86. The lower portion of the front casing 10 defines a sump 93 for lubrication oil which is drawn through a coarse filter 94 and an inlet pipe 95, into an inlet duct 96 drilled in an oil pump casing 97 secured by unshown bolts to the web 25. The oil pump is of the crescent type having a central gear 98 coaxially driven by the extension shaft 19 through a key 99, and meshing with an annulus gear 100 supported by its outer periphery in the oil pump casing 97 for rotation about an axis parallely spaced from the axis of the central gear 98. The flanks of the gears 98 and 100 are a close sealing fit between the adjacent walls of the web 25 and the oil pump casing 97. In known manner, the central gear 98 meshes only the closest portion of the annulus gear 100 and an unshown crescent shaped vane is arranged in the resultant gap between the gear 98 and 100. The operation of this type of pump is wel-known and it serves to draw lubrication oil through the inlet duct 96 and to discharge it through a discharge duct 101 formed in the web 25. From the discharge duct 101, the lubrication oil passes through a fine filter element 102 to a solenoid-operated three port valve 103, and to a pipe 104 containing a maximum pressure relief valve 105 connected to a lube pipe 106 interconnecting the three port valve 103 and a lube duct 107 formed in the oil pump casing 97. The lube duct 107 is connected to an annular gallery 108 formed in the oil pump casing 97 which is a close rotational fit over the extension shaft 19 so that the lubrication oil is transferred through a diametral bore 109 in the extension shaft 19 to a coaxial lubricant distribution bore 110 providing two main lubricant supplies. The first supply of lubricant issues from the right-hand end of the distribution bore 110 into the bore 29 for lubricating the bearing bush 28 and the thrust washer 35, and the lubricant passing to the right of the bearing bush 28 flows between the planet carrier 40 and the driving flange 34 to lubricate the annulus gear wheel 38, the lubricant passing to the left of the bearing bush 28 flowing between the splines 26 and 43 to lubricate the sun gear wheel 37, the planet gear wheels 36 and the needle roller bearings 42. The second supply of lubricant issues from a radial bore 111 through the extension shaft 19 to the annular space 112 between the bearing bushes 48 which it lubricates—from the annular space 112 the lubricant flows through the several small passages shown in the top half of the drawing for lubricating the relative sliding movements between the first sleeve 60 and the second and third sleeves 64 and 69, and the combined relative sliding and rotational movements between the first sleeve 60 and the cylindrical surface 55 of the tubular sleeve 53. The rotational components of the auxiliary gearing also entrain lubricant which is splash fed to most moving parts.

The solenoid-operated three port valve 103 is normally biased to the position shown in which the piston and cylinder device 57, 80 is exhausted through the passage 87 and the combined supply and return duct 86 to the lube system through the lube pipe 106, and the output of the pump 98, 100 flows through the pipe 104 and the relief valve 105 to the lube pipe 106. In this manner only the slight back-pressure of the lubrication system exists in the piston and cylinder device 57, 80 and the preloaded spring device 89 exerts a dominant bias.

However, when an electrical switch is operated by the driver of the motor vehicle, the solenoid of the three port valve 103 is energised to disconnect the combined supply and return duct 86 from the lube pipe 106 and to connect it to the supply of lubricant in pipe 104. Thus, lubricant is constrained to flow into the piston and cylinder device 57, 80 until the pressure reaches the maximum value set by the pressure relief valve 105 when the excess lubricant is spilled into the lube system. Although the energisation of the solenoid operated three port valve 103 monopolises the supply of lubricant for a short period, the short break in the supply of lubricant to the lube pipe 106 is quite acceptable. Whenever the piston and cylinder device 57, 80 contains lubricant under pressure, there will probably be slight leakage past the seals 82, 83, 84 and 85, but this leakage is also acceptable as the leaking lubricant assists with the general lubrication of the moving parts and eventually flows back to the sump 93. However, leakage past the seal 84 into the space between the web 52 and the first disc 59, and leakage past the seal 85 into the space between the web 52 and the cylinder 57, could be serious if the leaking lubricant is allowed to accumulate and build up pressure which will oppose the forces generated by the piston and cylinder device 57, 80. For this reason these spaces are connected by a common drain duct 113 to the sump 93.

A unidirectional roller clutch 114 has an outer race 115 shrunk into a corresponding recess in the planet carrier 40 to be held rotatively fast with the planet carrier, and an inner race 116 held rotatively fast with the sun gear wheel 37 by means of internal splines 117 engaging the sun wheel spines 49. The inner race 116 is spaced from the circlip 67 by a spacing washer 118, and is held axially fast with the sun gear wheel 37 by a circlip 119. The unidirectional roller clutch 114 operates in a well-known manner to lock the sun gear wheel 37 to the planet carrier 40 whilst the extension shaft 19 is driving the power output shaft 30 in a forward direction and the first and second brake members 56 and 58 are disengaged—if the direction of rotation of the extension shaft 19 is reversed, or if the power output shaft 30 tends to drive the extension shaft 19, or if the brake members 56 and 58 are engaged, the unidirectional clutch 114 will freewheel. As the inner race 116 of the roller clutch 114 will move axially with the sun gear wheel 37, and the rollers are axially located in the inner race 116, any axial sliding of the sun gear wheel 37 is accommodated by corresponding axial sliding between the rollers and the outer race 115.

Under all operating conditions in which there is no effective oil pressure in the piston and cylinder device 57, 80, the only axial forces exerted in the auxiliary gearing originate from the preloaded spring device 89 which exerts equal and opposite reactions on the third disc 74 and the piston 80, and these forces counteract each other in the form of equal and opposite forces of engagement of the first and second clutch members 61 and 62 applied to the first and second clutch surfaces 46 and 47. The forces exerted by the spring consequently are never applied to the casing 10, 11, 14, and no thrust bearings are required for transmitting any of the spring forces which are confined to components which are rotatively fast with each other. When compared with the methods employed by the prior art, this arrangement enables the effective spring force applied by a given spring to the unit-ratio-engaging clutches to be doubled, and avoids the problems both of earthing the spring reaction onto a stationary casing and of transferring the spring reaction between relatively-rotatable components.

Substantially similar conditions prevail when the piston and cylinder device 57, 80 contains oil pressure, as the resulting forces are applied in opposite directions to the cylinder 57 and to the piston 80 and result in opposite forces of engagement of the first and second brake members 56 and 58 applied to the first and second brake surfaces 50 and 51. However, the effective area of piston 80 is larger than the effective area of the cylinder 57, so the force of engagement of the second brake member 58 will be correspondingly larger than the force of engagement of the first brake member 56, and this results in a resultant force to the left being applied to the centre casing 14. This resultant force is completely cancelled by the force applied in the opposite direction to the left-hand end of the tubular sleeve 53 which is also subjected to the oil pressure and has an effective area equal to the difference between the effective areas of the piston 80 and the cylinder 57. As a result, all axial forces generated by the piston and cylinder device 57, 80 are earthed onto the rigid centre casing 14 where they completely cancel each other, and no thrust bearings are required for transmitting any of the piston and cylinder device forces which are confined to components which are rotatively fast with each other. When compared with the methods employed by the prior art, this arrangement enables the effective force applied by a given piston and cylinder device to the planetary-ratio-engaging brakes to the doubled, and avoids the problems of transferring the forces exerted by the piston and cylinder device between relatively-rotatable components, as well as neatly earthing all the forces onto a single casing member on which they completely cancel each other.

If desired, the tubular sleeve 53 could be omitted so that the cylinder 57 would be a sliding fit on the first sleeve 60 and have the same effective area as the piston 80, the operating fluid being conveyed through the web 52 into distribution passages in the first sleeve 60. Under these circumstances the first and second brake members 56 and 58 would always be completely disengaged before the first and second clutch members 61 and 62 start to engage, and the presence of the unidirectional clutch 114 would be most desirable to control the engagement of unit ratio when a power gear-change is made.

Nevertheless, the arrangement illustrated is preferred as the differential areas of the cylinder 57 and the piston 80 provide a most desirable side effect, in that the differential areas rendered the operation of the first and second brake member 56 and 58, and the first and second clutch members 61 and 62, self-timing in the manner that will now be described. Whilst oil pressure is being admitted to the piston and cylinder device 57, 80, the differential forces exerted on the cylinder 57 and the piston 80 are resisted by equal forces in the form of the action and the reaction of the spring device 89 which are holding the first and second clutch members 61 and 62 engaged. As the piston 80 has the larger effective area, the rising oil pressure will decrease the force of engagement of the first clutch member 61 more rapidly than the second clutch member 62, and the first clutch member will inevitably become fully disengaged whilst the second clutch member 62 is still effectively engaged. By suitably matching the differential areas of the piston 80 and the cylinder 57 with the preloading and rate of the spring device 89 and with the axial travel of the first disc 59 carrying the first clutch member 61 and the second brake member 58, it is possible to arrange for the second brake member 58 to engage the second brake surface 51 before the second clutch member 62 has been fully disengaged from the second clutch surface 47. Although this means that during every gear-change from unit ratio to the planetary overdrive ratio the second brake member 58 will be fighting the second clutch member 62 for the control of the reaction sun gear wheel 37, this period of conflict will be very short and the second brake member 58 will smoothly gain control thereby providing a smooth gear-change into the overdrive ratio without loss of power. As soon as the second clutch member 62 has become disengaged, the first brake member 56 will become progressively engaged. As soon as the oil pressure in the piston and cylinder device 57, 80 is released, the reverse sequence will occur. As a result the gear changes between the planetary overdrive and unit ratios will never pass through a neutral condition and smooth gear-changes in both directions will be achieved without loss of power transmission. Under these conditions the unidirectional clutch 114 becomes redundant unless very high levels of torque are to be transmitted during a gear-change from the overdrive ratio to the unit ratio. Under these circumstances it will be appreciated that a single type of auxiliary gear unit could be used for both high powered and lower powered vehicles, the only difference being the exclusion of the unidirectional clutch 114 in the auxiliary gear unit for the lower powered vehicles.

If desired, the Belleville type spring device 89 can be replaced by an annular series of preloaded compression coil springs reacting between the third disc 74 and the piston 80.

The teaching of this invention is also applicable to auxiliary gear units in which the planetary ratio is an underdrive ratio. The overdrive auxiliary gear unit described would be converted to an underdrive auxiliary gear unit merely by making the power output shaft 30 the power input shaft, by making the extension shaft 19 the power output shaft, and by revising the position of the unidirectional clutch 114, if this item is required, so that it will lock the reaction sun gear wheel 37 to one of the casing members 10, 11 or 14 whenever the first and second brake members 56 and 58 are engaged.

If desired, the planet gear wheels 36, the sun gear wheel 37 and the annulus gear wheel 38 may have complementary helical gear teeth so that the sun gear wheel 37 will generate an axial thrust of a value commensurate with the torque transmitted by the auxiliary gearing, and in an axial direction dependent on the direction of torque transmission. For instance if the extension shaft 19 is driving the power output shaft 30 in a clockwise direction when viewed from the left of the drawing, and the sun gear wheel 37 has helical gear teeth of right-hand form, the sun wheel thrust will be to the left—any reversal of torque will reverse the direction of this thrust. Alternatively, the sun gear wheel 37 could have helical gear teeth of left-hand form, but this will naturally reverse the directions of the axial thrusts generated.

As the sun gear wheel 37 is axially locked to the first brake member 56 and the second clutch member 62, and is axially connected by the preloaded spring device 89 and the piston and cylinder device 57, 80 to the second brake member 58 and to the first clutch member 61, it will be appreciated that the axial thrust generated by the sun gear wheel 37 in either direction will be applied to whichever of the brake and clutch members are engaged.

On the basis that the brake members 56 and 58 are engaged by the maximum pressure permitted in the piston and cylinder device 57, 80 by the pressure relief valve 105, the sun wheel thrust in either direction will be applied directly to the third disc 74. If the sun wheel thrust is directed towards the left in the drawing, the third disc 74 will apply the reaction directly to the cylinder 57 and this will tend to decrease the force of engagement of the first brake member 56. This will have no effect on the force of engagement of the second brake member 58 even if the sun wheel reaction is strong enough to disengage the first brake member 56, as the oil pressure in the piston and cylinder device cannot exceed the maximum value due to the action of the pressure relief valve 105. On the other hand, if the sun wheel thrust is directed towards the right, the third disc 74 and the oil pressure in the piston and cylinder device are incapable of transmitting any additional forces to the first brake member 56, and the sun wheeel thrust will be transmitted through the preloaded spring device 89 to decrease the force of engagement of the second brake member 58. It should accordingly be appreciated that the application of sun wheel thrust in either direction will not enhance the force of engagement of the planetary ratio. Whenever the planetary ratio is engaged, the sun gear wheel 37 is at the right-hand limit of its travel and, if desired the application sun wheel thrust to the right when the planetary ratio is engaged can be prevented by means of a thrust washer or buffer spring arranged between the right-hand end of the sun gear wheel 37 and the planet carrier 40— a small axial gap should be left at this point to allow for compression and wear of the first brake lining.

On the other hand, if the clutch members 61 and 62 are engaged, the sun wheel thrust in either direction will be applied directly to both the second disc 63 and the third disc 74. If the sun wheel thrust is directed to the left in the drawing, it will be applied directly to increase the force of engagement of the second clutch member 62 and will have no effect on the first clutch member 61 unless the addition of the sun wheel thrust causes some compression of the second clutch member 62—in this event the force exerted by the spring device 89 on the first clutch member 61 will be reduced slightly. If, on the other hand, the sun wheel thrust is directed to the right, it will be applied directly to decrease the force of engagement of the second clutch member 62 and will have no effect on the first clutch member 61 unless the second clutch member 62 becomes uncompressed or disengaged— in this event the force exerted by the spring device 89 on the first clutch member 61 will be increased slightly but not as quickly as the force of engagement of the second clutch member 62 is decreased. Thus only the application of sun wheel thrust to the left will enhance the force of engagement of the unit ratio. Whenever the unit ratio is engaged, the sun gear wheel 37 is at the left-hand limit of its travel, and the application of sun wheel thrust to the right can be prevented by allowing the sun gear wheel 37 to move to the right relatively to the second disc 63 for instance by removing the circlip 68.

Thus only a sun wheel thrust to the left in the drawing produces the effect of increasing the force of engagement of one of the ratios, and this ratio is the unit drive condition. Accordingly, if it is desired to use sun wheel thrust to increase the force of engagement of the unit ratio under some predetermined drive transmission condition, the hand of the sun gear wheel teeth should be arranged to generate an axial thrust to the left under this predetermined drive transmission condition.

It should additionally be noted that the rotational components of the auxiliary gearing illustrated have a higher inertia than a corresponding prior auxiliary gearing of comparable torque capacity, and that this extra inertia is beneficial in slowing down the rate at which the sun gear wheel 37 and associated rotational components are accelerated during a gear-change from the planetary ratio to the unit ratio.

What I claim as my invention and desire to secure by Letters Patent of the United States is:

1. A change-speed gearing comprising
 a planetary gear train including
  a power input member,
  a power output member,
  and a reaction member,
 a first ratio selecting means operable for holding the reaction member against rotation whereby the planetary gear train will transmit drive between the power input member and the power output member at a planetary ratio,
 a second ratio selecting means operable for locking the reaction member to another rotary component of the planetary gear train whereby the planetary gear train will transmit drive between the power input member and the power output member at unit ratio,
 wherein one of said ratio selecting means includes a pair of friction-engaging members which are rotatively fast with the reaction member but are axially movable relatively to each other, one of said friction-engaging members being axially movable in one direction from an operative position in which it is engaged with a complementary first friction-engaging surface to an inoperative position in which it is disengaged from said first friction-engaging surface, the other of said friction-engaging members being axially movable in the opposite direction from an operative position in which it is engaged with a complementary second friction-engaging surface to an inoperative position in which it is disengaged from said second friction-engaging surface,
 a first axial bias means arranged for reacting between the pair of friction-engaging members for biasing them to their said respective operative positions,
 a second axial bias means arranged for reacting between the pair of friction-engaging members for biasing them to their said respective inoperative positions,
 and a control means for regulating the operation of the first and second axial bias means to determine whether the friction-engaging members will be biased to their said respective operative or inoperative positions,
 one of said first and second axial bias means is a preload spring device reacting between the pair of friction-engaging members,
 the other of said first and second axial bias means is a fluid-operable piston and cylinder device arranged for reacting between the pair of friction-engaging members in opposition to the preloaded spring device,
 and said control means is arranged to regulate the operation of the fluid-operable piston and cylinder device between a first condition in which the preloaded spring device will exert a dominant bias on the pair of friction-engaging members and a second condition in which the fluid-operable piston and cylinder device will overcome the bias of the preloaded spring device and will exert an opposite dominant bias on the pair friction-engaging members,
 wherein the improvement comprises the fluid-operable piston and cylinder device is arranged to exert differential forces on the pair of friction-engaging members whereby the friction-engaging member on which the greater force is exerted will be moved axially against the bias of the preloaded spring device before the friction-engaging member on which the lesser force is exerted will start to move axially against the bias of the preloaded spring device.

2. A change-speed gearing, according to claim 1, in which the other of said ratio selection means includes
 a second pair of friction-engaging members which are also rotatively fast with the reaction member and are axially movable relatively to each other,
 one friction-engaging member of the second pair is axially movable in said one direction from an operative position in which it is engaged with a complementary third friction-engaging surface to an inoperative position in which it is disengaged from said third friction-engaging surface,
 the other friction-engaging member of the second pair is axially movable in the said opposite direction from an operative position in which it is engaged with a complementary fourth friction-engaging surface to an inoperative position in which it is disengaged from said fourth friction-engaging surface,
 said first axially bias means is arranged for reacting between the second pair of friction-engaging members for biasing them to their said respective inoperative positions,
 and said second axial bias means is arranged for reacting between the second pair of friction-engaging members for biasing them to their said respective operative positions,
 whereby the operation of said first axial bias means by said control means will cause the first pair of friction-engaging members to be biased to their respective operative positions whilst causing the second pair of friction-engaging members to be biased to their respective inoperative positions,
 and the operation of said second axial bias means by said control means will cause the first pair of friction-engaging members to be biased to their respective inoperative positions whilst causing the second pair of friction-engaging members to be biased to their respective operative positions,
 the first and second complementary friction-engaging surfaces are respective first and second brake surfaces defined by non-rotary structure,
 the third and fourth complementary friction-engaging surfaces are respective first and second clutch surfaces defined by structure rotatively fast with said another rotary component of the planetary gear train, said one ratio selecting means being the first ratio selecting means whereby the first pair of friction-engaging members are in the form of brake members, said other ratio selecting means being the second ratio selecting means whereby the second pair of friction-engaging members are in the form of clutch members, the brake member for engaging the first brake surface is held axially fast with the clutch member for engaging the second clutch surface, the brake member for engaging the second brake surface is held axially fast with the clutch member for engaging the first clutch surface, the first axial bias means is a fluid-operable piston and cylinder device reacting between the brake members for engaging the first and second brake surfaces, the second axial bias means is a preloaded spring device reacting between the clutch members for engaging the first and second clutch surfaces, the brake member for engaging the second brake surface and the clutch member for engaging the first clutch surface are axially fast with an axially-movable sleeve which is secured to the piston of said fluid-operable piston and cylinder device, the brake member for engaging the first brake surface defines the cylinder of said fluid-operable piston and cylinder device, first combined sliding and rotary sealing means are arranged between the piston and the brake member for engaging the first brake surface, and second combined sliding and rotary sealing means are arranged operatively between the axially movable sleeve and the brake member for engaging the first brake surface.

3. A change-speed gearing, according to claim 2, in which a tubular sleeve fast with the non-rotary structure defining the first and second brake surfaces extends into the fluid-operable piston and cylinder device between the axially movable sleeve and the brake member for engaging the first brake surface, one portion of said second combined sliding and rotary sealing means is arranged between the axially movable sleeve and the tubular sleeve, another portion of said second combined sliding and rotary sealing means is arranged between the tubular sleeve and the brake member for engaging the first brake surface, and the tubular sleeve defines a passage for the supply of operating fluid to the interior of the piston and cylinder device.

4. A change-speed gearing, according to claim 2, in which the brake member for engaging the first brake surface is secured to a second axially movable sleeve which extends coaxially through the first said axially movable sleeve, the first and second axially movable sleeves are drivingly secured to each other but are arranged for relative axial movement, the second axially movable sleeve is fast with the clutch member for engaging the second clutch surface at the opposite axial end to its connection with the brake member for engaging the first brake surface, and the preloaded spring device is arranged to react between the piston of said fluid-operable piston and cylinder device and the second axially movable sleeve.

5. A change-speed gearing, according to claim 1, in which the transmission of torque between the planetary gear train and at least one of the said ratio selecting means through said reaction member passes through helically-engaged surfaces to provide an axial end thrust commensurate with the torque applied to said helically-engaged surfaces, and abutment means arranged to apply the axial end thrust to increase the force of engagement of the corresponding friction engaging members under predetermined drive conditions.

References Cited

UNITED STATES PATENTS

| 2,806,387 | 9/1957 | Forster et al. | 74—781 X |
| 3,016,121 | 1/1962 | Mosbacher | 192—18 X |
| 3,146,637 | 9/1964 | Whateley et al. | 74—781 |
| 3,182,528 | 5/1965 | Lamburn | 74—781 X |
| 3,382,736 | 5/1968 | Abbott | 74—781 X |

FOREIGN PATENTS

| 869,715 | 3/1953 | Germany | 192—18 |

CARLTON R. CROYLE, Primary Examiner

T. C. PERRY, Assistant Examiner

U.S. Cl. X.R.

192—18 A